Jan. 30, 1934.  E. A. SPERRY  1,944,954

FLAW DETECTOR FOR ELECTRICAL CONDUCTORS

Original Filed Aug. 10, 1928

INVENTOR
ELMER A. SPERRY DEC'D
BY EDWARD G. SPERRY, EXECUTOR

BY Joseph H. Lipschutz
ATTORNEY

Patented Jan. 30, 1934

1,944,954

UNITED STATES PATENT OFFICE 1,944,954

FLAW DETECTOR FOR ELECTRICAL CONDUCTORS

Elmer A. Sperry, deceased, late of Brooklyn, N. Y., by Edward G. Sperry, executor, Brooklyn, N. Y., assignor to Sperry Products, Inc., Brooklyn, N. Y., a corporation of New York Original application August 10, 1928, Serial No. 298,771. Divided and this application August 1, 1931. Serial No. 554,485

5 Claims. (Cl. 175—183)

This invention relates to means for detecting inequalities, flaws, fissures, slag or other inclusions and abnormal conditions generally in electrical conductors, particularly wires, cables, bars and the like. This application is a division of co-pending application Serial No. 298,771, filed August 10, 1928, for Fissure detector for metals. The method here employed comprises passing a current through the conductor to establish an electro-magnetic field surrounding the same and to detect any variations in the axis of the current caused by any of the imperfections noted above by means of a pair of opposed detector coils designed to generate a differential E. M. F. whenever such flaw or imperfection is encountered.

The invention has particular applicability to the specific material tested, namely, wires, cables or the like, and provides means whereby the current through the conductor is automatically shut off as the end of the cable approaches the current supply brushes.

It is a further object of the invention to provide means whereby the current brushes and the detector coils may be moved away from the conductor to an ineffective position as the end of the wire or cable approaches the current brushes.

It is a further object of the invention to provide means for automatically varying the current density through the conductor corresponding to the speed of movement of the conductor relative to the detector mechanism.

It is a further object of the invention to provide means for measuring the amount of conductor that has passed through the detecting mechanism.

Further objects and advantages of the invention will become apparent in the following detailed description thereof.

In the accompanying drawing.

Figure 1:
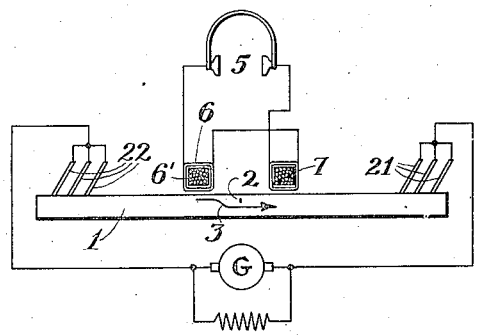
Fig. 1 is a diagram illustrating the method of flaw detection employed in this invention.
Figure 2:
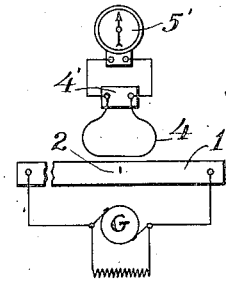
Fig. 2 is a second diagram showing the simplest form of detecting means which may be employed in this invention.
Figure 3:
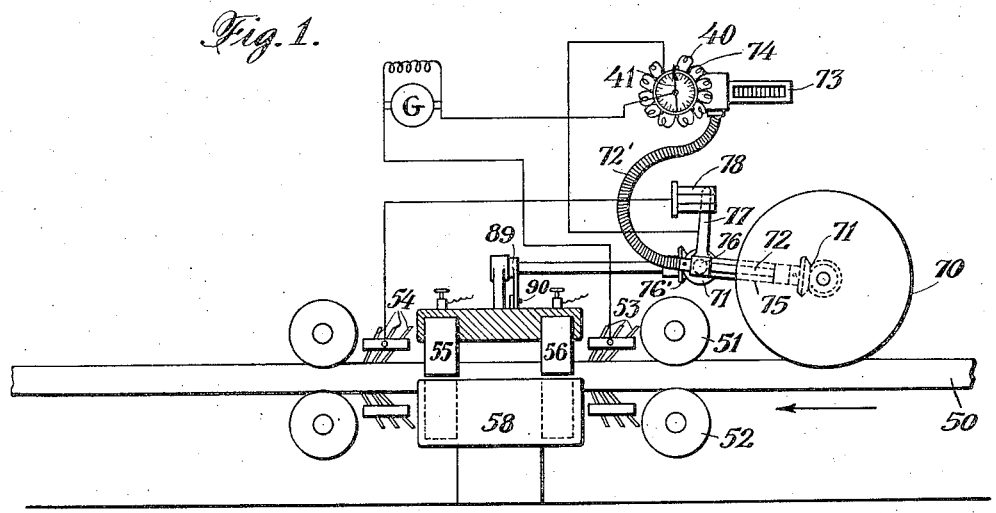
Fig. 3 is a side view, partly in diagrammatic form, of the invention as applied to the testing of wire or cable in a rolling mill.

Referring first to Figs. 1 and 2, if a current is passed through the bar 1 from generator G and the bar possesses no hidden flaws or fissures, the current will flow uniformly therethrough and, therefore, a uniform magnetic field will surround the bar. If, however, there is a fissure or blowhole at, say, point 2 in the bar, which lies near the top, the main portion of the current will pass under the fissure as shown by the arrow 3. This will, of course, produce a change in the magnetic field surrounding the bar at that point, weakening the field above the bar. If then the wire 4 of Fig. 2 or the coil or coils 6 and 7 of Fig. 1 are moved relative to the bar near the surface thereof, the E. M. F. or current induced in the same will be varied as point 2 is passed over, which variation may be utilized to give an indication of the flaw. This variation may be amplified in any suitable manner at 4', such as by thermionic tubes to actuate a recorder or indicator 5', or the coils may be connected to ear phones 5 which act both as an amplifier and detector. It is preferable to employ a second coil 7, cross-connected with the coil 6 so as to balance out the effect of variations in the physical speed relatively between the coil and conductor and also any variations in voltage in the main supply current through the same. In other words, if the amount of current flowing through the conductor or the speed of travel varies materially, a change in E. M. F. would be simultaneously generated in each coil but since the two coils are opposed, this would balance out so that no indication would reach the amplifier, receiver or indicator.

Figure 4:
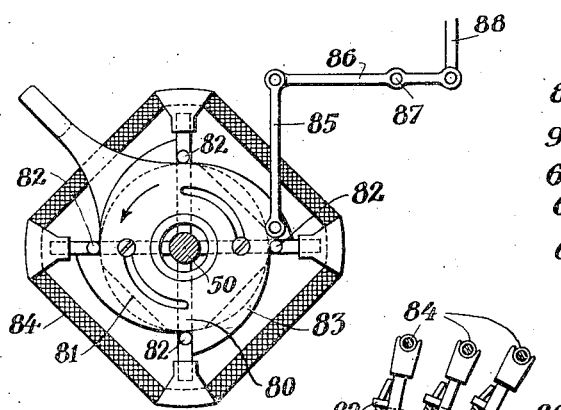
Fig. 4 is an end elevation of one of the main supply brushes and operating mechanism therefor.
Figure 5:
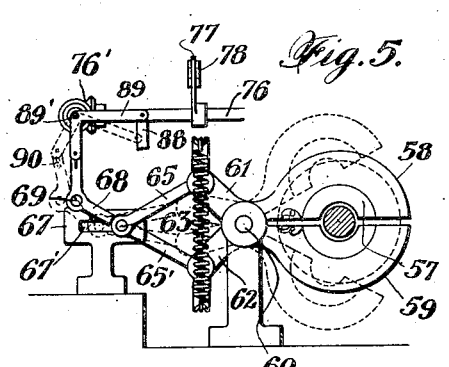
Fig. 5 is an end elevation of the apparatus looking in the direction of the arrow in Fig. 3.
Figure 6:
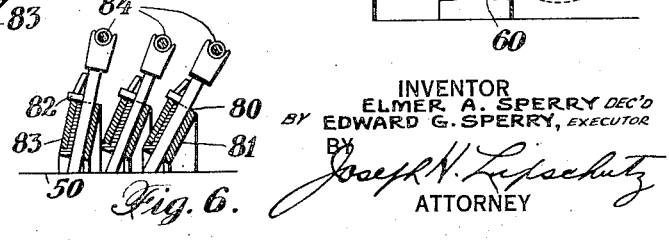
Fig. 6 is a detail of one group of main supply brushes, certain of the parts being shown in section.

The above system of flaw detection is more fully described and claimed in the said co-pending application, Serial No. 298,771, but the said principle of detection is applied to the testing of metallic wire, cable or rod as shown in Figs. 3 to 6 inclusive, which form of invention is applicable to the testing of such conductors as they pass through the rolling mills. The wire is shown at 50 and is represented as moving rapidly in the direction of the arrow between the rollers 51, 52. Current is supplied to the wire by the main brushes 53, 54. Between said brushes are placed a pair of spaced detector coils 55, 56, which, in this instance, surround the wire to some predetermined extent. Said coils are preferably split or open at one side together with the permalloy centers 57, and are mounted on hinged frames 58, 59 so that they may be opened as shown in dotted lines in Fig. 5, the two frames being hinged at the point 60. Frames 58 and 59 are each provided with ears 61, 62 extending beyond the pivot 60 and connected to a spring 63 which normally tends to pull the ears together as shown in dotted lines in Fig. 5 and thus open the coils. A pair of pivoted links 65, 65' are shown as hinged to ears 61, 62, forming a pantograph. The outer end of the pantograph is shown as slidable in a slot 67' in bracket 67 and is normally held forwardly, as shown in Fig. 5 by trip 68, secured to a shaft 69. When said trip 68 is revolved upwardly as shown in dotted lines, the spring immediately opens the coils as shown in Fig. 5, thus releasing the wire and placing the coils where they will not be harmed by the loose end of the wire as it flies through the apparatus.

Resting on the wire at the right side of the apparatus is shown a wheel 70 which is revolved by the passage of the wire thereunder. Said wheel is shown as driving through suitable bevel gearing 71, a shaft 72 which operates through flexible shaft 72', a linear measuring device 73 so that if a flaw is encountered the section of wire it lies in may be readily located. Said shaft is also shown as operating a speed indicator 74. The wheel 70 is journalled on a bell crank lever 75 pivoted on shaft 76. The upwardly extending arm 77 of the bell crank lever normally makes contact with a switch 78. When, therefore, the wire passes from under the wheel 70 it drops down, moving arm 77 out from engagement with switch 78. Switch 78 is in the main circuit of the supply brushes so that means are thus provided for opening the main supply current when the end of the wire is reached, thus preventing severe sparking at the main supply brushes.

Also, it is preferable to connect the speed indicator 74 with a resistance or other means for varying the amount of supply current. It is advantageous to send as much current as possible through the wire and this amount may, of course, be increased with the speed of the wire, since at high speed the wire will not have time to heat up and may carry many times the current it could carry if at rest. Means is therefore provided for increasing the current with the speed or, stated another way, for decreasing the current as the speed decreases, thus providing for maximum operating efficiency under all conditions without the danger of overheating the wire. To this end the speed indicator is shown as operating a rheostat or variable resistance 40, the movable arm 41 in the rheostat being connected to or actuated by the speed indicator, so when the speed is low a much less current is sent through the wire than when the speed is great.

Preferably also means is provided to move the main supply brushes out of the path of the free end of the wire, when the end of the wire is reached as well as the detector coils. For this purpose the main supply brushes are shown as mounted for sliding in four radial slots 80 in a supporting frame 81 so that the brushes may be moved into or out of contact with the wire 50 (Fig. 4). Each brush has a pin 82 thereon which connects to the slot adjacent the brush and bears on one portion of a four-part cam 83. When the cam is revolved counter-clockwise, i. e., in the direction of the arrow in Fig. 4, it will readily be seen that all four brushes will be withdrawn from contact with the wire 50. The brushes are normally held against the wire by a continuous spring band 84 (see Fig. 6). The brushes are also preferably placed at a slightly different angle to the wire as shown.

Said cam 83 is preferably revolved to withdraw the brushes by the dropping of the roller 70 as it reaches the end of the wire, which operation also performs the other functions described above. As shown, a link 85 is pivoted to the cam which is connected to the lever 86 pivoted at 87. The outer end of said cam is in turn connected to a link 88 which is pivoted to bell crank lever 89. Said lever in turn is shown as secured to shaft 89' which is operated from shaft 76 through bevel gears 76'. At its lower end, lever 89 also operates the bell crank lever 68 by a pin slot connection 90 so that the main supply brushes are withdrawn at the same time that the split coils are open to prevent damage to the apparatus.

In accordance with the provisions of the patent statutes, the principle and operation of the invention has been described, together with the apparatus which is now considered to represent the best embodiment thereof, but it is desired to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described the invention, what is claimed and desired to be secured by Letters Patent is:

1. An apparatus for detecting defects in electrical conductors such as wire, cables, bars and the like, said conductor being adapted to be fed through the apparatus, comprising means for passing an electric current between spaced points as the conductor passes through the apparatus, a flaw-responsive means positioned adjacent said conductor between said points of current introduction, and means controlled by the approach of the end of said conductor to said apparatus for moving said flaw responsive means away from the conductor.

2. In an apparatus for detecting hidden defects in electrical conductors such as wire, cables, bars, and the like, said conductor being adapted to be fed through the apparatus, means for supplying electric current to the conductor as it passes through the apparatus, a flaw-responsive means adjacent said conductor, and means controlled by the rate of feed of said conductor for varying the amount of current supplied to the conductor in predetermined proportion to the said rate of feed.

3. In an apparatus for detecting defects in electrical conductors such as wire, cables, bars and the like, said conductor being adapted to be fed through the apparatus, a plurality of spaced brushes for supplying current to the conductor, means for moving said brushes into and out of contact with the conductor, a split test coil normally surrounding said conductor, and means for opening and closing the said split coil.

4. An apparatus for detecting defects in electrical conductors such as wire, cables, bars and the like, said conductor being adapted to be fed through the apparatus, comprising means including a plurality of current brushes for passing an electric current between spaced points as the conductor passes through the apparatus, a flaw responsive means positioned adjacent said conductor between said points of current introduction, and means controlled by the approach of the end of said conductor to said apparatus for moving said current brushes away from the conductor.

5. An apparatus for detecting defects in electrical conductors such as wire, cables, bars and the like, said conductor being adapted to be fed through the apparatus, comprising means including a plurality of current brushes for passing an electric current between spaced points as the conductor passes through the apparatus, a flaw responsive means positioned adjacent said conductor between said points of current introduction, and means controlled by the approach of the end of said conductor to said apparatus for moving said current brushes and said flaw-responsive means away from the conductor.

EDWARD G. SPERRY,
*Executor of the Estate of Elmer A. Sperry, Deceased.*